(12) United States Patent
Fukushima et al.

(10) Patent No.: US 12,153,275 B2
(45) Date of Patent: Nov. 26, 2024

(54) ALIGNMENT DEVICE AND LENS ALIGNMENT SYSTEM

(71) Applicant: THK CO., LTD., Tokyo (JP)

(72) Inventors: Hajime Fukushima, Tokyo (JP); Jun Hirota, Tokyo (JP); Junichi Iguchi, Tokyo (JP); Marie Shimamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 722 days.

(21) Appl. No.: 17/298,300

(22) PCT Filed: Dec. 2, 2019

(86) PCT No.: PCT/JP2019/046948
§ 371 (c)(1),
(2) Date: May 28, 2021

(87) PCT Pub. No.: WO2020/116373
PCT Pub. Date: Jun. 11, 2020

(65) Prior Publication Data
US 2022/0026661 A1   Jan. 27, 2022

(30) Foreign Application Priority Data

Dec. 3, 2018   (JP) .............................. 2018-226797
Jul. 18, 2019   (JP) .............................. 2019-132721

(51) Int. Cl.
*G02B 7/00*   (2021.01)
*G02B 7/02*   (2021.01)
*G03B 21/14*   (2006.01)

(52) U.S. Cl.
CPC ............. *G02B 7/005* (2013.01); *G02B 7/022* (2013.01); *G03B 21/142* (2013.01)

(58) Field of Classification Search
CPC ........ G02B 7/005; G02B 7/022; G02B 7/026; G02B 7/08; G02B 7/023; G03B 21/142; H04N 5/74
See application file for complete search history.

(56) References Cited

U.S. PATENT DOCUMENTS 6,342,944 B1 * 1/2002 Okamoto ............... G03B 27/62
                                                      355/72
6,375,355 B1 * 4/2002 Fortin .................. A61B 6/0442
                                                      5/624

(Continued)

FOREIGN PATENT DOCUMENTS

CN      203715171 U      7/2014
CN      105388301 A      3/2016

(Continued)

OTHER PUBLICATIONS

Office Action dated Nov. 8, 2022, issued in counterpart JP Application No. 2018-226797, with English Translation. (6 pages).

(Continued)

*Primary Examiner* — James C. Jones
(74) *Attorney, Agent, or Firm* — WHDA, LLP

(57) ABSTRACT

An alignment device includes a base table, a plurality of electric actuators attached to the base table, an alignment table supported by the plurality of electric actuators. Each of the plurality of electric actuators includes a linear motion device that drives the alignment table in a direction approaching or separating from the base table.

11 Claims, 12 Drawing Sheets

(56) References Cited

U.S. PATENT DOCUMENTS

| | | |
|---|---|---|
| 2004/0004676 A1 | 1/2004 | Kim |
| 2004/0070695 A1 | 4/2004 | Kim |
| 2005/0185152 A1 | 8/2005 | Velde et al. |
| 2019/0033696 A1 | 1/2019 | Chikamoto et al. |

FOREIGN PATENT DOCUMENTS

| | | |
|---|---|---|
| CN | 106434272 A | 2/2017 |
| CN | 106737476 A | 5/2017 |
| JP | 59-86200 A | 5/1984 |
| JP | 8-195923 A | 7/1996 |
| JP | 2003-302703 A | 10/2003 |
| JP | 2005-62434 A | 3/2005 |
| JP | 2006-91464 A | 4/2006 |
| WO | 2017/126426 A1 | 7/2017 |

OTHER PUBLICATIONS

Office Action dated Aug. 3, 2022, issued in counterpart CN Application No. 201980079227.0, with English Translation. (16 pages).
International Search Report dated Mar. 3, 2020, issued in counterpart International Application No. PCT/JP2019/046948, w/English translation (4 pages).

* cited by examiner

ALIGNMENT DEVICE AND LENS ALIGNMENT SYSTEM

CROSS-REFERENCE TO RELATED APPLICATIONS

This application is a National Stage Application filed under 35 U.S.C. § 371 of International Application No. PCT/JP2019/046948 filed on Dec. 2, 2019 which claims the benefit of priorities under 35 U.S.C. 6119 (a) of Japanese Patent Application No. 2018-226797 filed in Japan on Dec. 3, 2018 and Japanese Patent Application No. 2019-132721 filed in Japan on Jul. 18, 2019, the contents of which are incorporated herein by reference.

TECHNICAL FIELD

The present invention relates to an alignment device and a lens alignment system.

The present application claims priority based on Japanese Patent Application No. 2018-226797 filed in Japan on Dec. 3, 2018, and Japanese Patent Application No. 2019-132721 filed in Japan on Jul. 18, 2019, the contents of which are incorporated herein by reference.

BACKGROUND ART

The alignment device described in Patent Document 1 described below includes an inclination adjustment mechanism (sec FIGS. 10 and 11 of Patent Document 1). The inclination adjustment mechanism includes first to fourth adjustment screws interposal between a slide base (base table) and a common base (alignment table) equipped with an optical system. In the alignment device, the inclination of the common base is adjusted with respect to the slide base by moving the first to fourth adjustment screws.

PRIOR ART

Patent Document

[Patent Document 1] Japanese Unexamined Patent Application, First Publication No. S59-86200

DISCLOSURE OF INVENTION

Problems to be Solved by the Invention

In order to adjust the inclination of the common base with respect to the slide base, a certain clearance amount is required between a nut of the adjustment screw and the screw shaft. However, since the required clearance amount changes in accordance with the target inclination, it is difficult to select an appropriate nut and screw shaft.

The present invention provides an alignment device and a lens alignment system having an appropriate clearance amount between a nut and a screw shaft with respect to a target inclination of an alignment table.

Means for Solving the Problems

According to the first aspect of the present invention, an alignment device includes a base table, a plurality of linear motion devices attached to the base table, and an alignment table supported by the plurality of linear motion devices. Each of the plurality of linear motion devices includes a nut fixed to one of the base table and the alignment table, and a screw shaft that moves the nut in a direction approaching or separating from the other of the base table or the alignment table. When an outer diameter of the screw shaft is M, a distance between the screw shafts is L, an inclination of the alignment table with respect to the base table is $\theta$, a length of the nut with respect to the screw shaft in the thrust direction is N, and a clearance amount in a radial direction between the nut and the screw shaft is Tr, the relationship $Tr > (M+L)(1-\cos\theta) + N\sin\theta$ is satisfied.

According to the second aspect of the present invention, a lens alignment system includes the alignment device described above that adjusts at least one of the tilt angle of the lens that projects the light and the focus of the lens, and a lens shift device that supports the alignment device and moves the alignment device at least in a two-axis orthogonal direction orthogonal to the optical axis direction of the light.

Effects of the Invention

According to the above-described aspect of the present invention, an alignment device and a lens alignment system having an appropriate clearance amount between a nut and a screw shaft with respect to the target inclination of the alignment table can be obtained.

BEST MODE FOR CARRYING OUT THE INVENTION

Hereinafter, embodiments of the present invention will be described with reference to the drawings. The embodiments shown below are described by way of example in order to better understand the gist of the invention, and are not limited to the present invention unless otherwise specified.

First Embodiment

Figure 1:
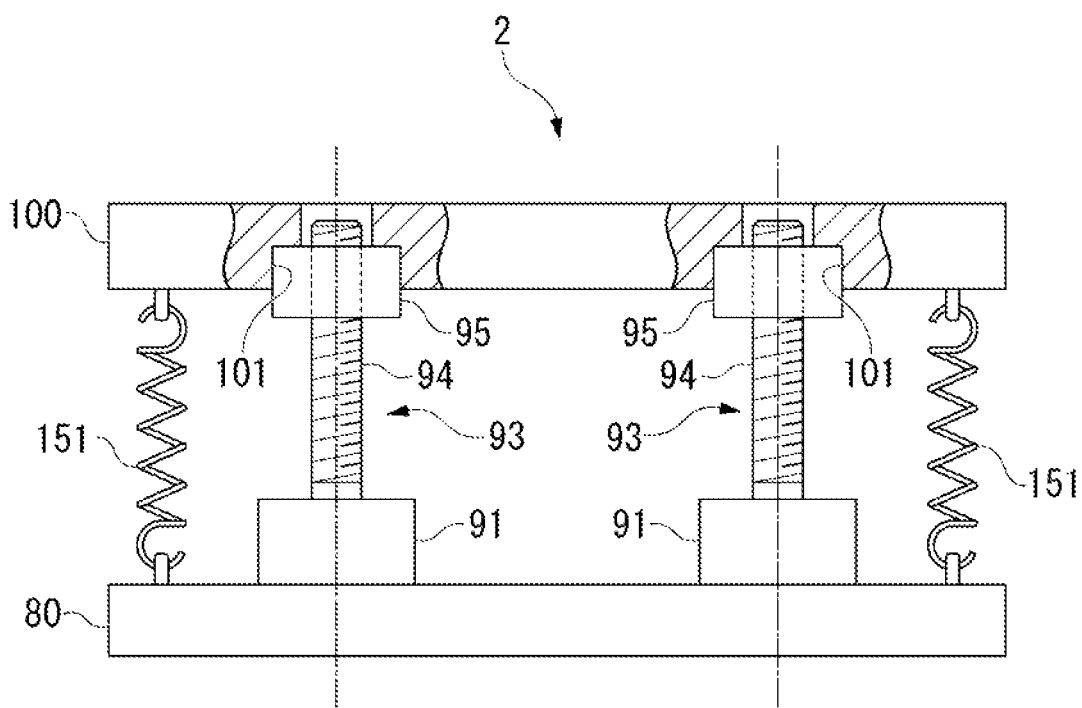
FIG. 1 is a configuration diagram of an electric alignment device according to the first embodiment of the present invention.

FIG. 1 is a configuration diagram of an electric alignment device 2 according to the first embodiment of the present invention.

The electric alignment device (alignment device) 2 includes a base table 80, a plurality of linear motion devices 93 attached to the base table 80, and an alignment table 100 supported by the plurality of linear motion devices 93. The linear motion device 93 of the present embodiment is an electric actuator including a motor 91. The linear motion device 93 does not have to include the motor 91; that is, it may be a manual alignment device.

The base table 80 is formed in a plate shape extending along a horizontal plane. The alignment table 100 is arranged above the base table 80. The alignment table 100 is formed in a plate shape extending along a horizontal plane in parallel with the base table 80. The linear motion device 93 is interposed between the base table 80 and the alignment table 100. The linear motion device 93 moves the alignment table 100 in a direction approaching or separating from the base table 80 (vertical direction in FIG. 1).

The linear motion device 93 includes a nut 95 fixed to the alignment table 100, and a screw shaft 94 moving the nut 95 in a direction approaching or separating from the base table 80. The nut 95 is inserted into a through-hole 101 formed in the alignment table 100, and is fixed to the alignment table 100 by a bolt or the like (not shown). The nut 95 is screwed cm the upper side of the screw shaft 94, and the lower side of the screw shaft 94 is connected to the motor 91 via a speed reducer or the like (not shown).

According to the linear motion device 93 having the above-described configuration, when the screw shaft 94 is rotated around the axis by the motor 91, the nut 95 fixed to the alignment table 100 is screwed in the axial direction. As a result, the alignment table 100 moves in the direction approaching or separating from the base table 80 (vertical direction). A clearance (described later) for inclining the alignment table 100 with respect to the base table 80 is formed between the screw shaft 94 and the nut 95. By making the feed amount of the nut 95 in each linear motion device 93 different, the alignment table 100 can be inclined with respect to the horizontal plane.

An urging member 151 is arranged between the alignment table 100 and the base table 80. The urging member 151 of the present embodiment is a tension spring. The urging member 151 urges the alignment table 100 in a direction close to the base table 80. As a result, the urging member 151 suppresses rattling of the alignment table 100 due to the clearance between the screw shaft 94 and the nut 95 described above.

Subsequently, in the electric alignment device 2 including the above-described configuration, the clearance amount between the nut 95 and the screw shaft 94 required for the inclination of the target alignment table 100 will be described.

Figure 2:
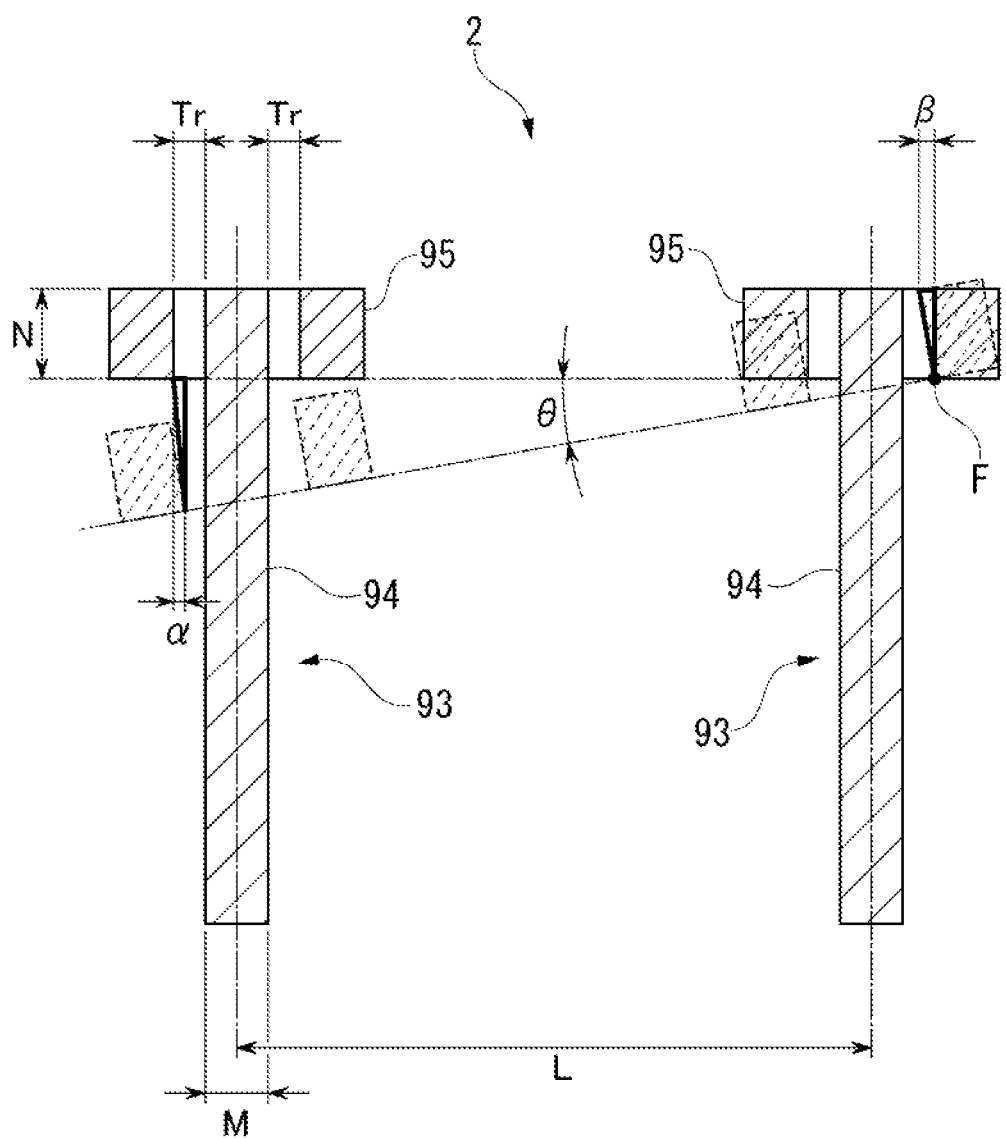
FIG. 2 is a model diagram of the electric alignment device according to the first embodiment of the present invention.

FIG. 2 is a model diagram of the electric alignment device 2 according to the first embodiment of the present invention.

As described above, the electric alignment device 2 includes the nut 95 and the screw shaft 94, and enables the screw feed of the nut 95. Here, in a simplified model with a cylindrical shape, the clearance amount between the nut 95 and the screw shaft 94 in the radial direction is derived.

The screw model requires more clearance than the cylindrical model shown in FIG. 2; however, the lower limit of the clearance amount can be specified by the formula described below.

As shown in FIG. 2, in the electric alignment device 2, one nut 95 serves as a fulcrum F, and the other nut 95 is displaced causing an inclination θ of the alignment table 100. When the alignment table 100 is inclined, a displacement of α occurs at a side of the nut 95 that is not the fulcrum F and a displacement of β occurs at a side of the nut 95 that is the fulcrum F, and the clearance amount (Tr) between the nut 95 and the screw shaft 94 in the radial direction decreases. Note that Tr is the total clearance amount between the nut 95 and the screw shaft 94 in the radial direction.

Here, when the outer diameter of the screw shaft 94 is M, the mutual distance between the screw shafts 94 (distance between the central shafts) is L, the inclination of the alignment table 100 with respect to the base table 80 is θ, the hook length of the nut 95 in the thrust direction with respect to the screw shaft 94 is N, and the displacement amount of the nut 95 that is not the fulcrum F in the radial direction is α, α can be calculated by the following formula (1).

$$\alpha = (M+L) - (M+L)\cos\theta = (M+L)(1-\cos\theta) \quad (1)$$

In addition, when the displacement amount of the nut 95 which is the fulcrum F in the radial direction is β, β can be calculated by the following formula (2).

$$\beta = N\sin\theta \quad (2)$$

The value obtained by adding α and β calculated by the above-described formulae (1) and (2) is the minimum required clearance amount Tr of the nut 95 and the screw shaft 94 in the radial direction with respect to the inclination θ of the alignment table 100. That is, Tr can be calculated by the following formula (3).

$$Tr = \alpha + \beta = (M+L)(1-\cos\theta) + N\sin\theta \quad (3)$$

Since the above-described Tr is the lower limit value of the clearance amount between the nut 95 and the screw shaft 94 in the radial direction, the actual (i.e., in actual use) clearance Tr may satisfy the following formula (4). As a result, an appropriate nut 95 and screw shaft 94 can be selected with respect to the target inclination θ of the alignment table 100.

$$Tr > (M+L)(1-\cos\theta) + N\sin\theta \quad (4)$$

By converting the clearance amount between the nut 95 and the screw shaft 94 in the thrust direction into a clearance amount in the radial direction to add to the above-described formula (4), a more appropriate nut 95 and screw shaft 94 can be selected.

Figure 3:
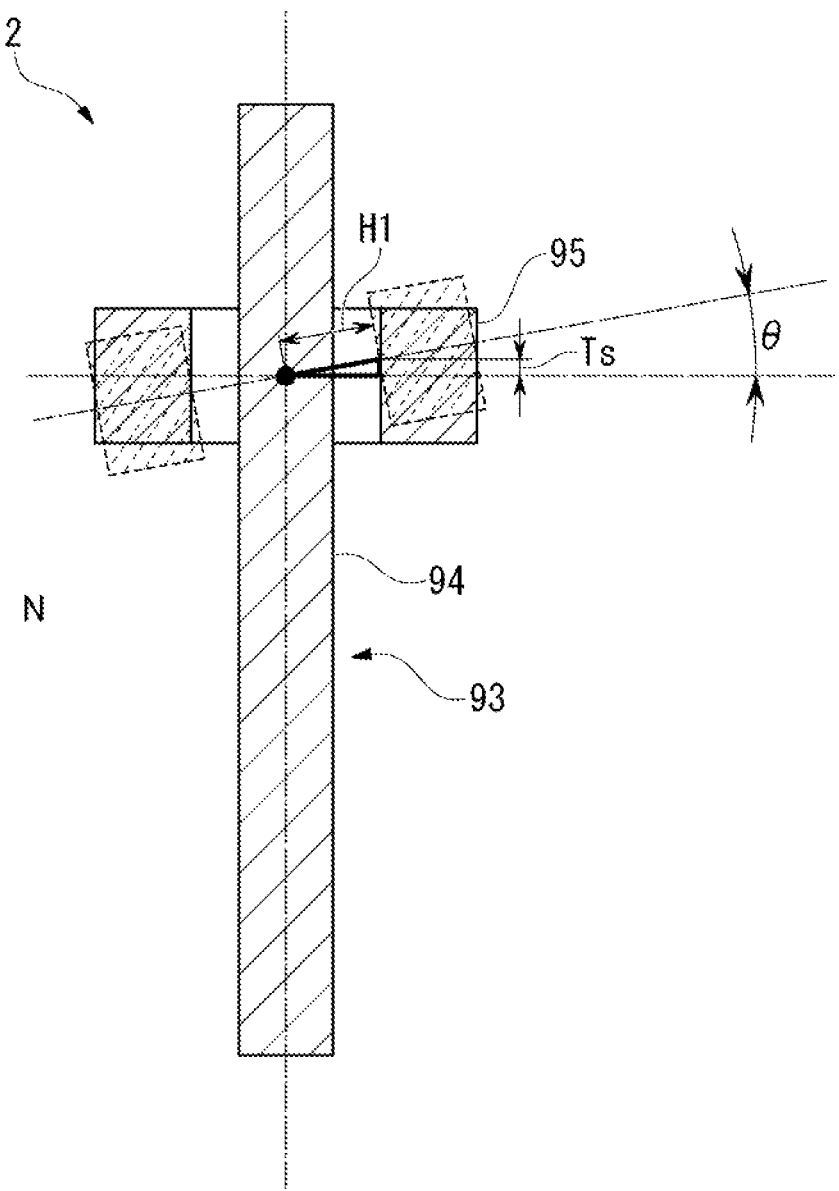
FIG. 3 is a model diagram of a linear motion device according to the first embodiment of the present invention.
Figure 4:
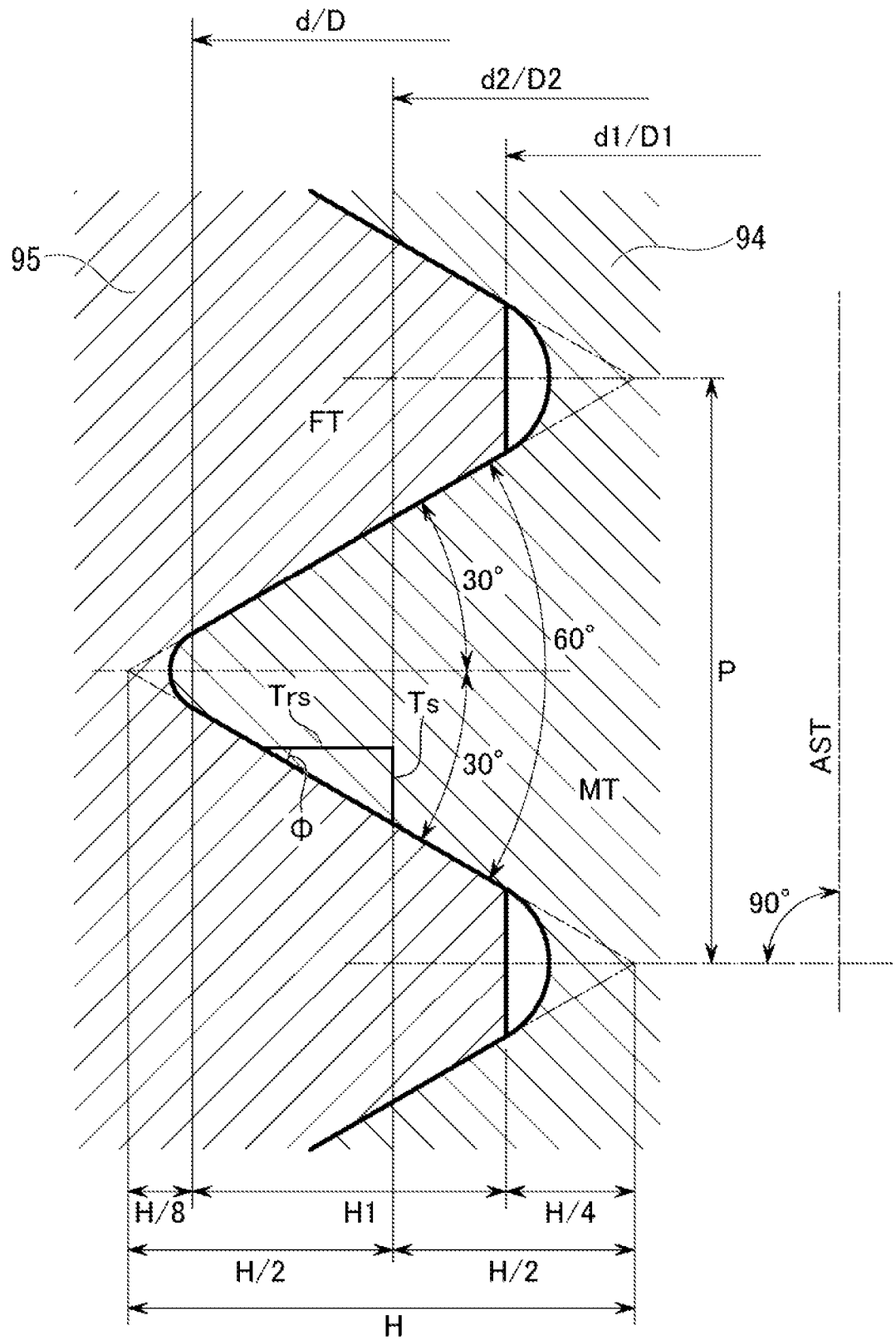
FIG. 4 is a reference diagram for converting a change in the clearance amount between the nut and the screw shaft in the thrust direction in the first embodiment of the present invention into a clearance amount in the radial direction.

FIG. 3 is a model diagram of the linear motion device 93 according to the first embodiment of the present invention. FIG. 4 is a reference diagram for converting a change in the clearance amount between the nut 95 and the screw shaft 94 in the thrust direction in the first embodiment of the present invention into a clearance amount in the radial direction. In FIG. 4, FT represents a female thread. MT represents a male thread. AST represents an axis line of the screw.

As described above, when the inclination θ occurs in the alignment table 100, the inclination θ also occurs in the nut 95 as shown in FIG. 3.

Here, when the inclination of the nut 95 (inclination of the alignment table 100 with respect to the base table 80) is θ, the hooking height of the nut 95 with respect to the screw shaft 94 in the radial direction is H1, and the required clearance amount between the nut 95 and the screw shaft 94 in the thrust direction with respect to the inclination θ of the nut 95 is Ts, Ts can be calculated by the following formula (5).

$$Ts = H1 \sin \theta \quad (5)$$

As shown in FIG. 4, for example, when the nut 95 (female thread: FT) and the screw shaft 94 (male thread: MT) are coarse threads, the hooking height H1 in the radial direction can be derived from the JIS standard for the coarse threads. Note that P in the same drawing is a pitch. In addition, H is the height of the thread. D, D2, and D1 are the diameter of the valley, the effective diameter, and the inner diameter of the female thread, respectively. Furthermore, d, d2, and d1 are the outer diameter, the effective diameter, and the diameter of the valley of the male thread, respectively.

When the nut 95 and the screw shaft 94 are coarse threads as shown in FIG. 4, the thread angle is 30 deg. When such a thread angle is Φ, the clearance amount between the nut 95 and the screw shaft 94 in the thrust direction is Ts, and the clearance amount Ts converted into the clearance amount of the radial direction is Trs, the following formula (6) is satisfied.

$$\tan \Phi = Ts/Trs \quad (6)$$

That is, Trs can be calculated by the following formula (7).

$$Trs = Ts/\tan \Phi = H1 \sin \theta / \tan \Phi \quad (7)$$

When the above-described formula (7) is added to the above-described formula (3) and the clearance amount between the nut 95 and the screw shaft 94 is unified by the clearance amount in the radial direction, the total clearance amount Trg in the radial direction can be calculated by the following formula (8).

$$Trg = (M+L)(1-\cos \theta) + N \sin \theta + H1 \sin \theta / \tan \Phi \quad (8)$$

Since the above-described Trg is the lower limit value of the total clearance amount between the nut 95 and the screw shaft 94 in the radial direction, the actual (i.e., in actual use) clearance Tr may satisfy the following formula (9). As a result, an appropriate nut 95 and screw shaft 94 in consideration of the clearance amount not only in the radial direction but also in the thrust direction with respect to the target inclination θ of the alignment table 100 can be selected.

$$Tr > (M+L)(1-\cos \theta) + N \sin \theta + H1 \sin \theta / \tan \Phi \quad (9)$$

When the inclination θ of the alignment table 100 is small, the clearance amount between the nut 95 and the screw shaft 94 in the radial direction is larger than the clearance amount in the thrust direction. For example, when θ<1 deg, the clearance amount in the radial direction is approximately 10 times larger, and the clearance amount in the radial direction is more dominant than the clearance amount in the thrust direction. Therefore, an appropriate nut 95 and screw shaft 94 may be selected by using the above-described formula (4).

As described above, according to the above-described embodiment, the alignment device includes the base table 80, the plurality of linear motion devices 93 attached to the base table 80, and the alignment table 100 supported by the plurality of linear motion devices 93. Each of the plurality of linear motion devices 93 includes the nut 95 fixed to one of the base table 80 and the alignment table 100 and the screw shaft 94 moving the nut 95 in a direction approaching or separating from the other of the base table 80 and the alignment table 100. When the outer diameter of the screw shaft 94 is M, the mutual distance between the screw shafts 94 is L, the inclination of the alignment table 100 with respect to the base table 80 is θ, the hook length of the nut 95 in the thrust direction with respect to the screw shaft 94 is N, and the clearance amount between the nut 95 and the screw shaft 94 in the radial direction is Tr, by employing the electric alignment device 2 that satisfies the relationship of the above-described formula (4), an appropriate nut 95 and screw shall 94 can be selected with respect to the target inclination θ of the target alignment table 100.

In the present embodiment, the relationship of the above-described formula (9) is further satisfied when the hooking height of the nut 95 with respect to the screw shaft 94 in the radial direction is H1 and the thread angle of the screw shaft 94 is Φ. Therefore, a more appropriate nut 95 and screw shaft 94 can be selected by adding the clearance amount in the thrust direction to the clearance amount in the radial direction.

In addition, in the present embodiment, as shown in FIG. 1, the linear motion device 93 is an electric actuator including a motor 91 rotating the screw shaft 94. Therefore, the alignment operation can be electrified and the alignment operation can be easily performed. As a result, skill such as screw-driving is not required for the alignment operation.

Furthermore, in the present embodiment, an urging member 151 urging the alignment table 100 in a direction approaching the base table 80 is provided. Therefore, it is possible to prevent the alignment table 100 from rattling due to the clearance amount set between the nut 95 and the screw shaft 94.

Second Embodiment

Next, the second embodiment of the present invention will be described. The second embodiment exemplifies a configuration in which the above-mentioned electric alignment device is applied to the lens alignment system described below. In the following description, the same or equivalent configurations as those in the above-described embodiment will be designated by the same reference numerals, and the description thereof will be simplified or omitted.

Figure 5:
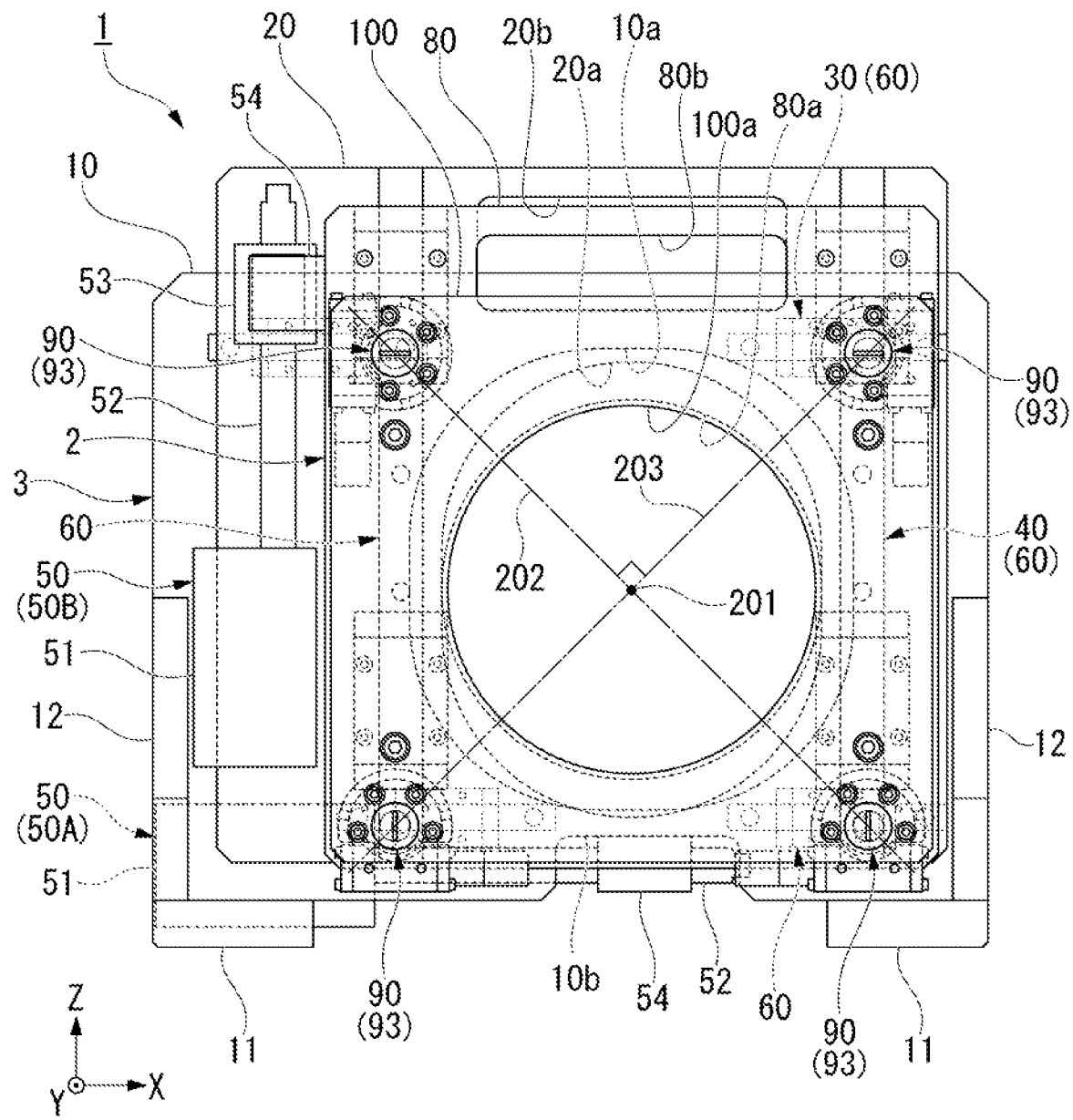
FIG. 5 is a front view of a lens alignment system according to the second embodiment of the present invention.
Figure 6:
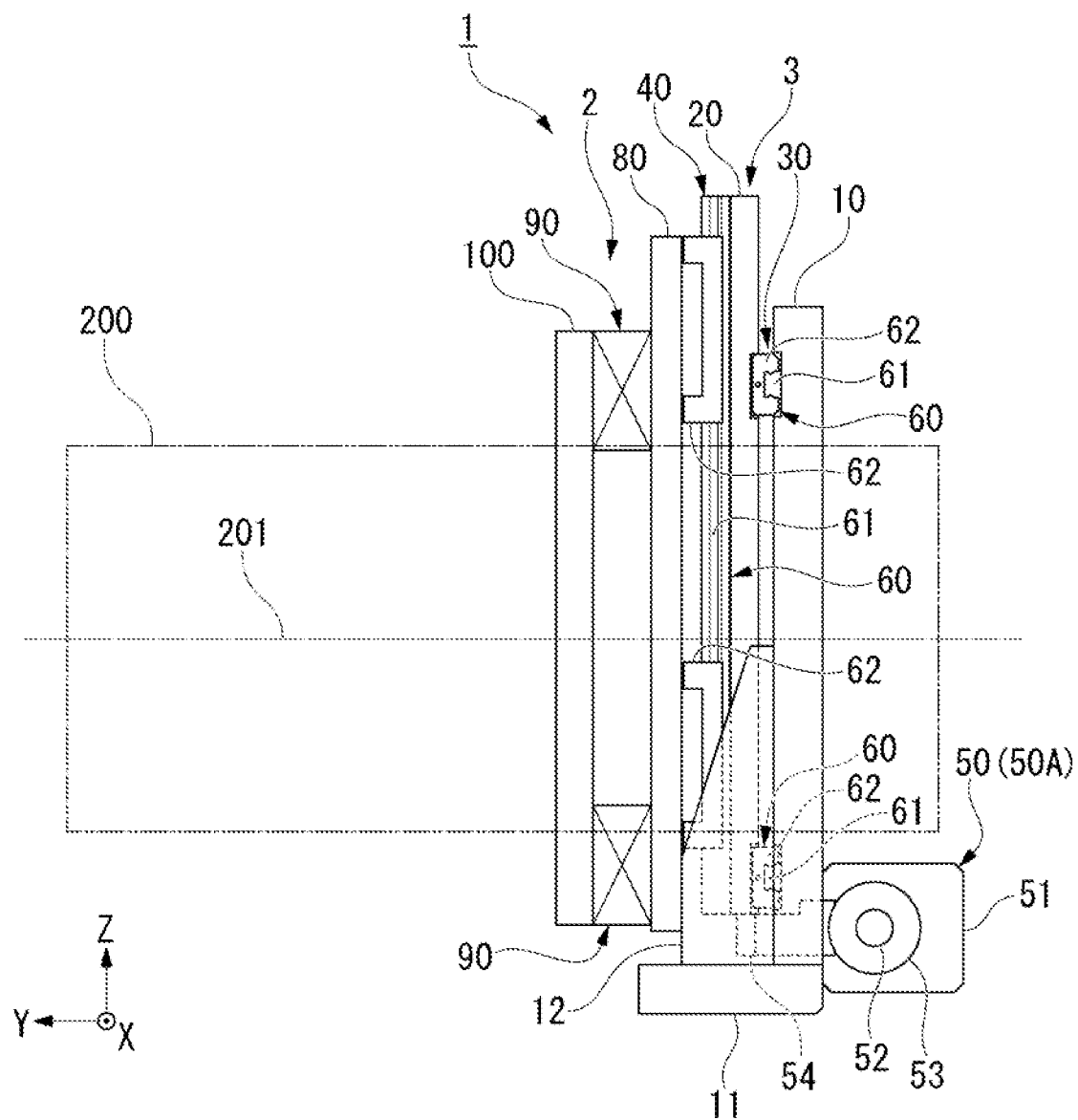
FIG. 6 is a right side view of the lens alignment system according to the second embodiment of the present invention.

FIG. 5 is a front view of the lens alignment system 1 according to the second embodiment of the present invention. FIG. 6 is a right side view of the lens alignment system 1 according to the second embodiment of the present invention.

As shown in these figures, the lens alignment system 1 includes an electric alignment device 2 to which a lens 200 projecting light is attached and an electric lens shift device (lens shift device) 3 moving the electric alignment device 2 in a two-axis orthogonal direction orthogonal to at least an optical axis of the light.

In the following descriptions, an XYZ Cartesian coordinate system is set, and the positional relationship of each member may be described with reference to the XYZ Cartesian coordinate system. The Y-axis direction is the optical axis direction (front-back direction of the lens alignment system 1). The X-axis direction is an optical axis orthogonal direction (left-right direction of the lens alignment system 1) orthogonal to the optical axis direction. The Z-axis direction is a second optical axis orthogonal direction (vertical direction of the lens alignment system 1) orthogonal to the X and Y-axis directions.

As shown in FIG. 6, the electric lens shift device 3 includes a fixation-side support member 10 that is fixed to a projector or other mounting object not shown in the drawings, an intermediate member 20 arranged in front of the fixation-side support member 10, a first lens guide portion 30 that guides the intermediate member 20 in the X-axis direction with respect to the fixation-side support member 10, the second lens guide portion 40 that guides the base table 80 of the electric lens shift device 3 against the intermediate member 20 in the Z-axis direction, and a drive portion 50 that moves the fixation-side support member 10, the intermediate member 20, and the base table 80 relative to each other via the first lens guide portion 30 and the second lens guide portion 40.

The fixation-side support member 10 is formed in a plate shape extending along the X-Z plane. As shown in FIG. 5, an insertion hole 10a through which the lens 200 is inserted and arranged in the Y-axis direction is formed in a substantially central portion of the fixation-side support member 10. At the lower end portion of the fixation-side support member 10, a recess 10b that is recessed upward is formed. As shown in FIG. 6, ground contact portions 11 extending in front of the fixation-side support member 10 are provided on both the left and right sides of the recess 10b. The upper surface of the ground contact portion 11 and the front surface of the fixation-side support member 10 are connected by a plate-shaped rib 12 having a substantially trapezoidal shape in the side view.

The intermediate member 20 is formed in a plate shape extending along the X-Z plane in parallel with the fixation-side support member 10. As shown in FIG. 5, an insertion hole 20a through which the lens 200 is inserted and arranged in the Y-axis direction is formed in a substantially central portion of the intermediate member 20. An elongated hole 20b extending in the left-right direction is formed above the insertion hole 20a of the intermediate member 20. The elongated hole 20b is used, for example, when gripping the intermediate member 20.

As shown in FIG. 6, the first lens guide portion 30 and the second lens guide portion 40 include a linear guide 60 including a track rail (track body) 61 and a slider block (moving body) 62. The first lens guide portion 30 includes a linear guide 60 in the X-axis direction in which one slider block 62 is assembled to one track rail 61 at four locations around the insertion hole 10a on the front surface of the fixation-side support member 10. In addition, the second lens guide portion 40 includes a linear guide 60 in the Y-axis direction in which two slider blocks 62 are assembled to one track rail 61 at two locations on the left and right sides of the insertion hole 20a on the front surface of the intermediate member 20.

Figure 7:
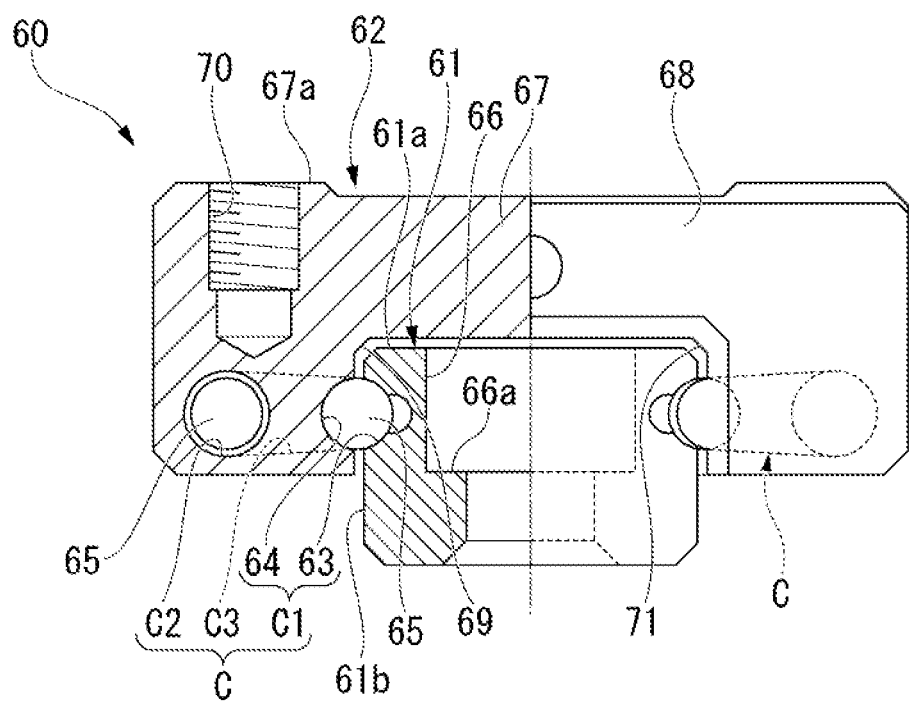
FIG. 7 is a configuration diagram of a linear guide according to the second embodiment of the present invention.

FIG. 7 is a block diagram of the linear guide 60 according to the second embodiment of the present invention.

The linear guide 60 includes a track rail 61 provided with a rolling body-rolling groove 63 along the longitudinal direction, a slider block 62 provided with a load rolling body-rolling groove 64 facing the rolling body-rolling groove 63, a plurality of balls (rolling bodies) 65 arranged between the rolling body-rolling groove 63 and the load rolling body-rolling groove 64.

The track rail 61 is a long member having a substantially rectangular cross section. A rolling body-rolling groove 63 is formed on the outer surface 61b in the width direction of the track rail 61 (left-right direction on the paper surface in FIG. 7) along the longitudinal direction of the track rail 61 (vertical direction on the paper surface in FIG. 7). The rolling body-rolling groove 63 is recessed in a substantially arc shape with respect to the outer surface 61b. The rolling body-rolling grooves 63 are formed in pairs on the left and right sides of the track rail 61.

The track rail 61 is formed with a fixation hole (track body-fixation hole) 66 for fixing the track rail 61 to an object (fixation-side support member 10 and intermediate member 20). The fixation hole 66 is formed so as to penetrate the track rail 61 in the thickness direction (vertical direction on the paper surface in FIG. 7). The fixation hole 66 is formal with a spot face 66a positioning a bolt (not shown) fixing the track rail 61 at a position lower than the upper surface 61a of the track rail 61.

The slider block 62 includes a block main body 67 and a lid body 68 attached to the block main body 67. The block body 67 has a rail accommodation groove 69 accommodating the track rail 61. The rail accommodation groove 69 is open on the lower surface of the block body 67. A fixation hole (moving body fixation hole) 70 for fixing an object (intermediate member 20 and base table 80) is formed on the mounting surface 67a, which is the upper surface of the block main body 67. The fixation hole 70 is formed at a predetermined depth in the thickness direction of the block body 67. The fixation hole 70 is a screw hole, and a bolt (not shown) fixing the object is screwed into the fixation hole 70.

The rail accommodation groove 69 is formed with a load rolling body-rolling groove 64 facing the rolling body-rolling groove 63 of the track rail 61. The load rolling body-rolling groove 64 is recessed in an arc shape with respect to the inner surface of the rail accommodation groove 69. The load rolling body-rolling groove 64 is formed in pairs on the left and right sides of the slider block 62 so as to sandwich the track rail 61. The load rolling body-rolling groove 64 faces the rolling body-rolling groove 63 of the track rail 61, and forms a load rolling body-rolling path C1 that rolls the ball 65 in a state where a load is applied.

An unload rolling body path C2 is formed in the block body 67. The unload rolling body path C2 is formed so as to penetrate the block body 67 in the longitudinal direction. The inner diameter of the unload rolling body path C2 is larger than the ball diameter of the ball 65 so that the hall 65 is not loaded. The unload rolling body-rolling path C2 is formed in pairs on the left and right sides of the slider block 62 corresponding to the load rolling body-rolling groove 64 (load rolling body-rolling path C1).

The lid body 68 is attached to both end surfaces in the longitudinal direction of the block body 67. Similarly to the block body 67, the lid body 68 has a rail accommodation groove 71 accommodating the track rail 61. The lid body 68 is formed with a rolling body-direction conversion path C3 on facing surfaces facing both end surfaces of the block body 67. The pair of rolling body-direction change paths C3 connect both ends of the load rolling body-rolling path C1 and the unloaded rolling body rolling path C2 to form an infinite circulation path C of the ball 65.

The infinite circulation path C is constituted by a pair of straight portions (load rolling body-rolling path C1 and unloaded rolling body-rolling path C2) extending in the longitudinal direction of the track rail 61, and a pair of semicircular arc curved portions (rolling-body direction conversion path C3) connecting the ends of the pair of the straight portions. In the present embodiment, two infinite circulation paths C are formed so as to extend in parallel along the longitudinal direction of the track rail 61 at intervals in the width direction of the track rail 61. A linear guide 60 with a total of four infinite circulation paths C, two on each right and left side, may be used. In addition, as the linear guide 60, a finite stroke-type linear guide in which the infinite circulation path C is not formed may be used. In the finite stroke-type linear guide, a cage (rolling body-holding member) is arranged between the rolling body-rolling groove 63 and the load rolling body-rolling groove 64, and the ball 65 is freely rotated by the ball holder provided in the cage.

The ball 65 is interposed between the track rail 61 and the slider block 62 to smoothly move the slider block 62 with respect to the track rail 61. The balls 65 of the present embodiment are arranged inside the infinite circulation path C with almost no clearance, and circulate in the infinite circulation path C.

Returning to FIG. 6, the drive portion 50 includes a first drive portion 50A that moves the intermediate member 20 in the X-axis direction via the first lens guide portion 30 attached to the fixation-side support member 10. The first drive portion 50A is fixed to a motor 51 fixed to the back surface of the fixation-side support member 10, a screw shaft 52 connected to the motor 51 and extending in the X-axis direction, a nut 53 screwed to the screw shaft 52, and a connecting member 54 that extends forward through a recess 10b (see FIG. 5) at the lower end portion of the fixation-side support member 10 and connects the nut 53 and the intermediate member 20. When the screw shaft 52 is rotated around the X axis by the motor 51, the nut 53 is screwed in the X axis direction, and the intermediate member 20 connected to the nut 53 via the connecting member 54 is moved in the X-axis direction with respect to the fixation-side support member 10.

As shown in FIG. 5, the drive portion 50 includes a second drive portion 50B that moves the base table 80 in the Z-axis direction via the second lens guide portion 40 attached to the intermediate member 20. The second drive portion 50B includes a motor 51 fixed to the left end of the front surface of the intermediate member 20, a screw shaft 52 connected to the motor 51 and extending in the Z-axis direction, a nut 53 screwed to the screw shaft 52, and a connecting member 54 connecting the nut 53 and the base table 80. When the screw shaft 52 is rotated around the Z axis by the motor 51, the nut 53 is screwed in the Z-axis direction, and the base table 80 connected to the nut 53 via the connecting member 54 moves in a Z-axis direction with respect to the intermediate member 20.

Next, the configuration of the electric alignment device 2 will be described. As shown in FIG. 6, the electric alignment device 2 includes a base table 80 that is arranged in front of the intermediate member 20 and can be moved in the Z-axis direction by the second lens guide 40, a plurality of electric actuators 90 attached to the base table 80, and an alignment table 100 supported by the plurality of electric actuators 90.

The base table 80 is formed in a plate shape extending along the X-Z plane in parallel with the intermediate member 20. As shown in FIG. 5, an insertion hole 80a through which the lens 200 is inserted and arranged in the Y-axis direction is formed in a substantially central portion of the base table 80. An elongated hole 80b extending in the left-right direction is formed above the insertion hole 80a of the base table 80. The elongated hole 80b is used, for example, when gripping the base table 80.

The alignment table 100 is arranged in front of the base table 80 and is formed in a plate shape extending along the X-Z plane in parallel with the intermediate member 20. As shown in FIG. 5, a mounting hole 100a for mounting the lens 200 is formed in a substantially central portion of the base table 80. The lens 200 is, for example, a lens barrel that houses a projection lens or the like. The lens 200 is fixed to the alignment table 100 by a fitting portion (not shown) provided at the mounting hole 100a, bolts (not shown) arranged around the mounting hole 100a, and the like.

The insertion hole 80a of the base table 80 is one size larger than the mounting hole 100a of the alignment table 100. In addition, the insertion hole 20a of the intermediate member 20 has an elongated hole shape in which the insertion hole 80a of the base table 80 is expanded in the Z-axis direction. The insertion hole 10a of the fixation-side support member 10 has a rectangular shape in which the insertion hole 80a of the base table 80 is further expanded in the X-axis direction. This prevents collisions with the insertion holes 10a, 20a, and 80a when the lens 200 mounted in the mounting holes 100a moves on the X-Y plane.

As shown in FIG. 5, the plurality of electric actuators 90 support the four corners of the alignment table 100 having a rectangular plate shape. Each electric actuator 90 of the present embodiment is arranged on diagonal lines 202 and 203 that are orthogonal to each other at the center of the mounting hole 100a (the position where the optical axis 201 passes) with the mounting hole 100a interposed therebetween. Each of these electric actuators 90 has a linear motion device 93 that drives the alignment table 100 in a direction approaching or separating from the base table 80 (Y-axis direction).

Figure 8:
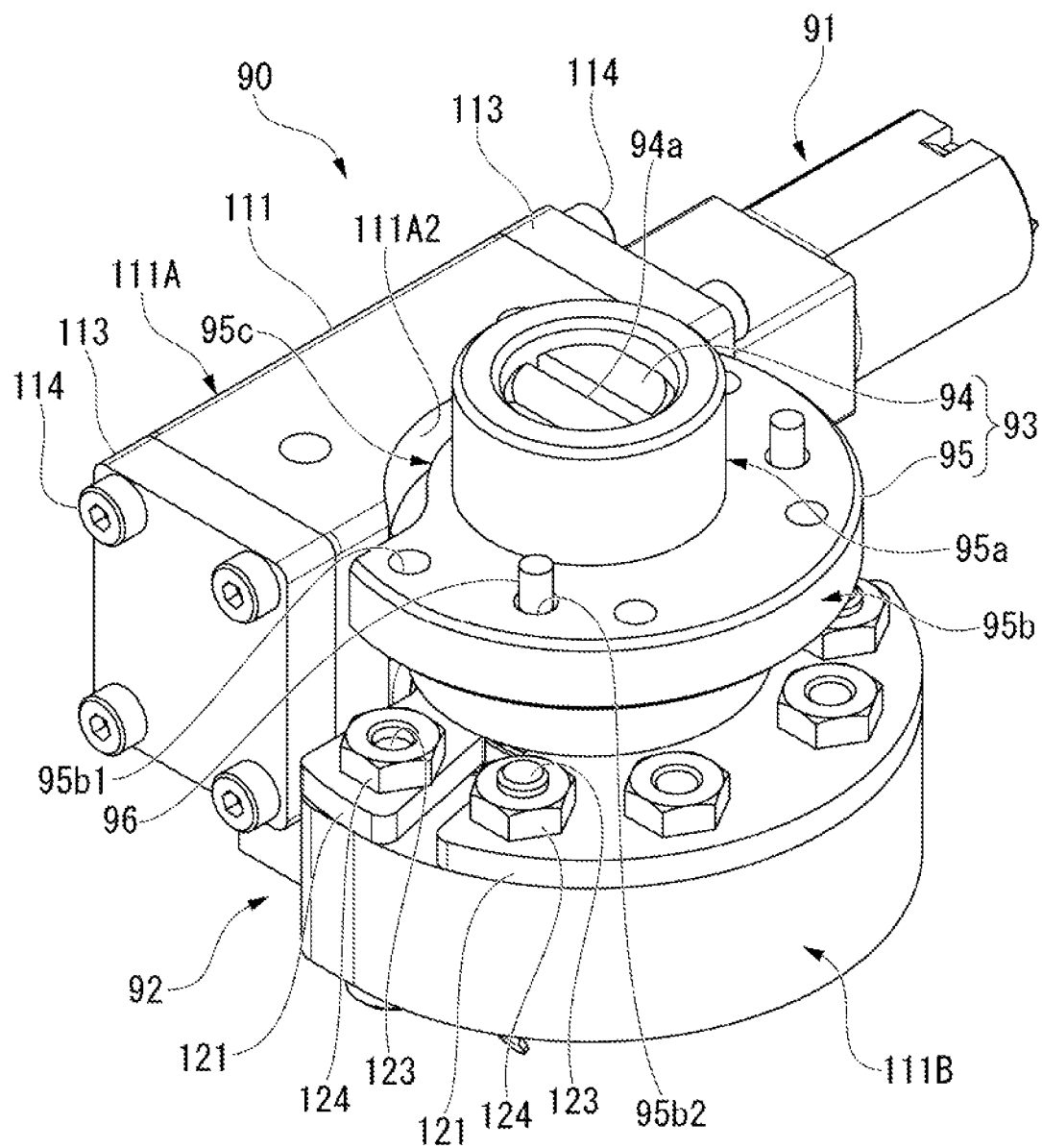
FIG. 8 is a perspective view of an electric actuator according to the second embodiment of the present invention.
Figure 9:
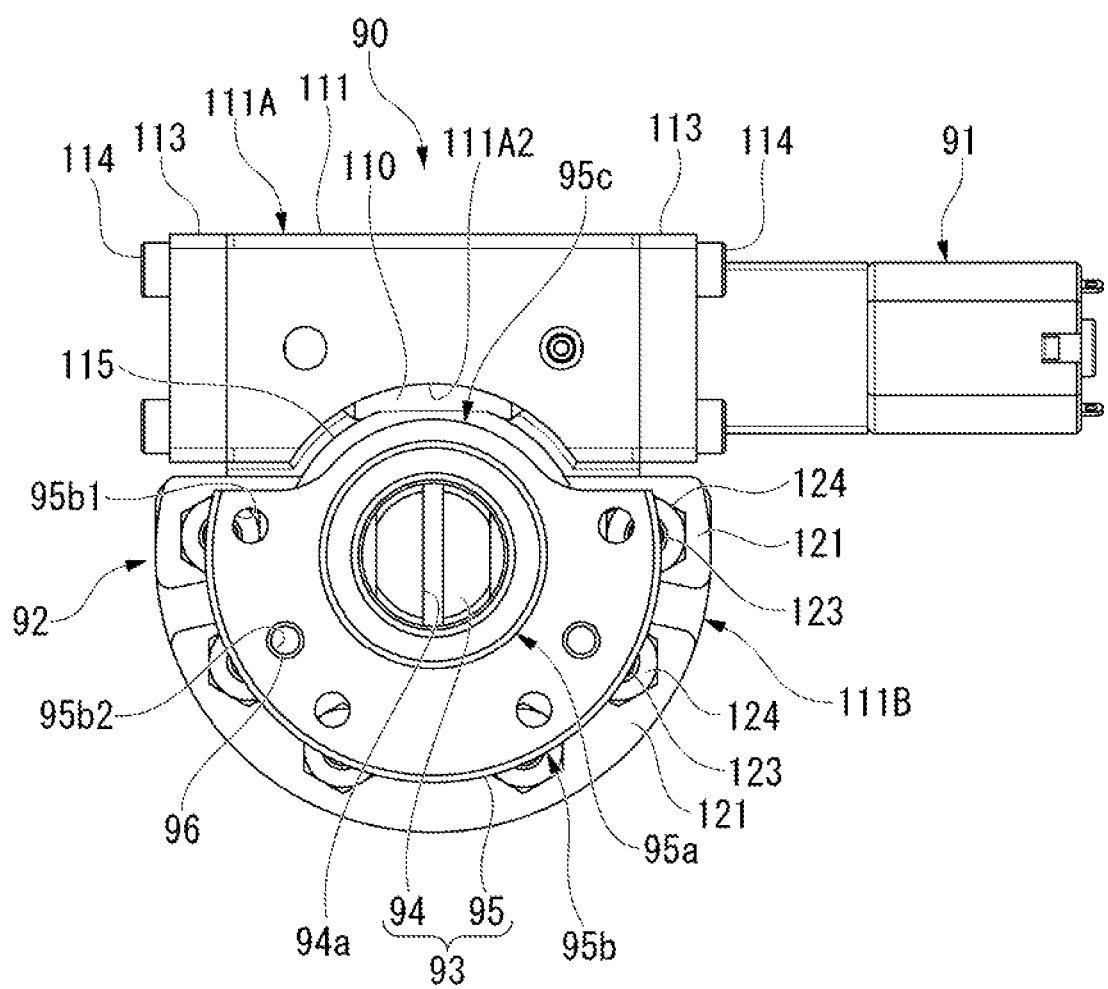
FIG. 9 is a plan view of an electric actuator according to the second embodiment of the present invention.
Figure 10:
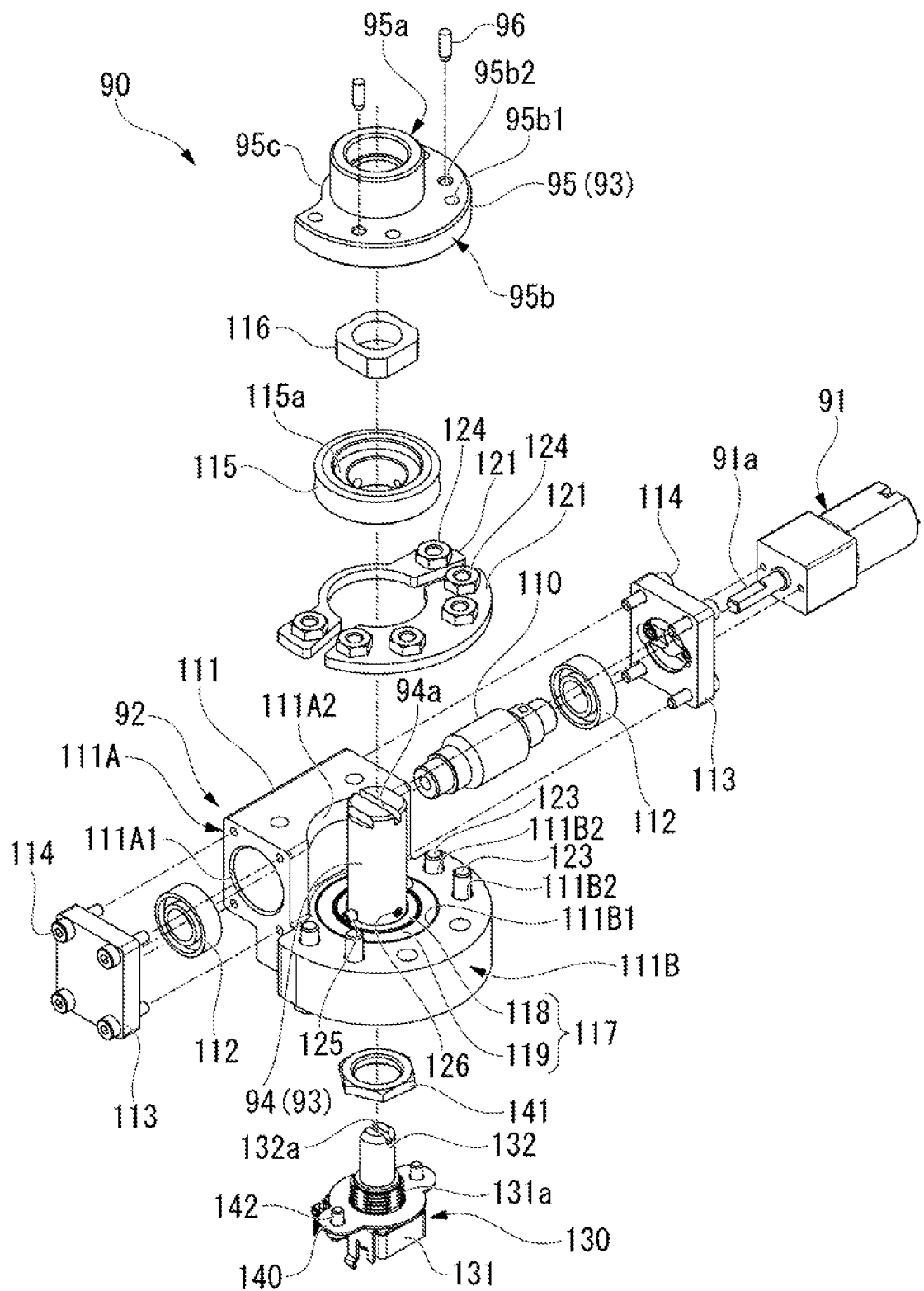
FIG. 10 is an exploded perspective view of an electric actuator according to the second embodiment of the present invention.
Figure 11:
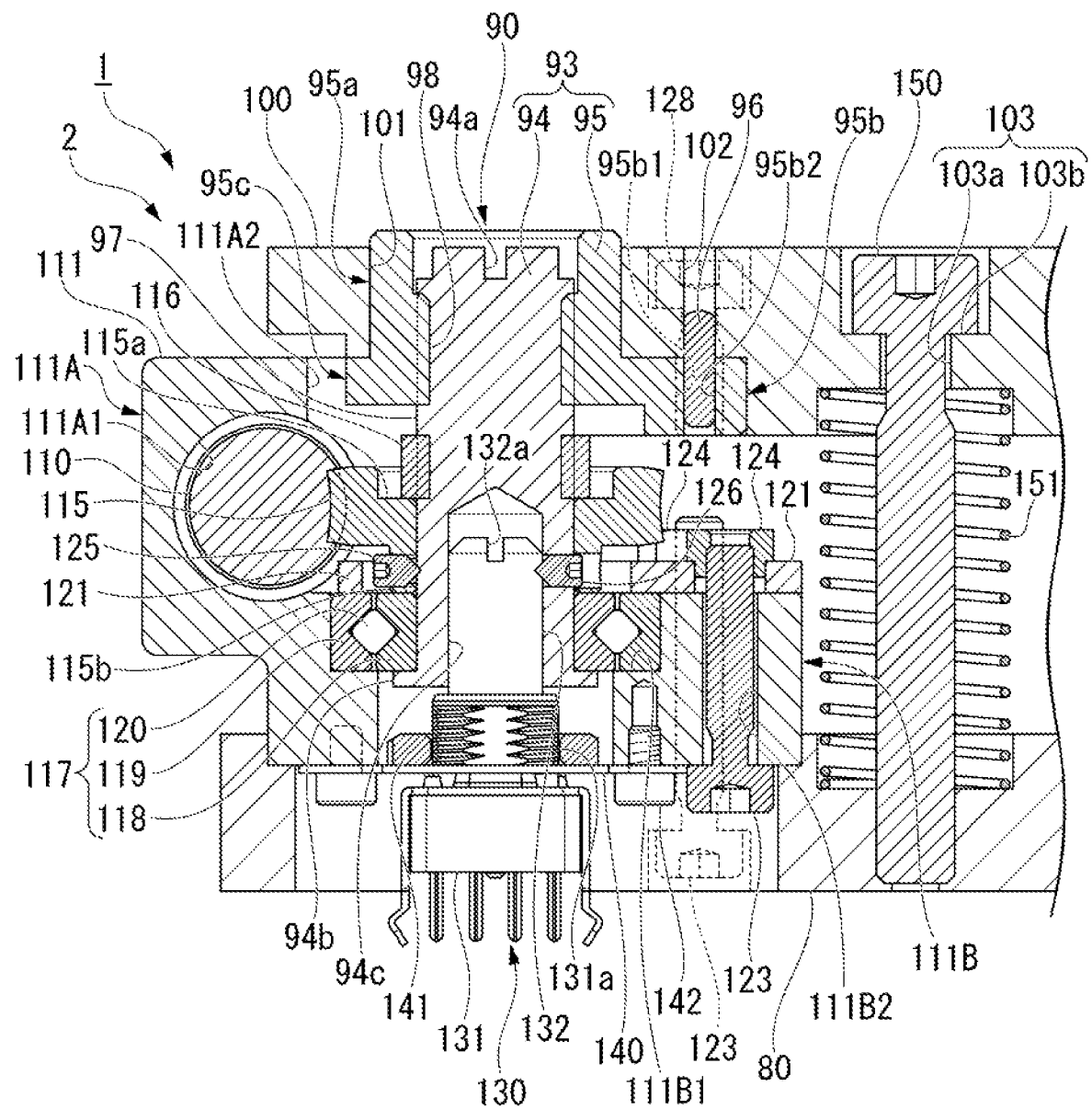
FIG. 11 is a cross-sectional configuration diagram of an electric actuator according to the second embodiment of the present invention.

FIG. 8 is a perspective view of the electric actuator 90 according to the second embodiment of the present invention. FIG. 9 is a plan view of the electric actuator 90 according to the second embodiment of the present invention. FIG. 10 is an exploded perspective view of the electric actuator 90 according to the second embodiment of the present invention. FIG. 11 is a cross-sectional configuration diagram of the electric actuator 90 according to the second embodiment of the present invention.

As shown in these figures, the electric actuator 90 includes a motor 91, a speed reducer 92, and a linear motion device 93.

As shown in FIG. 10, a rotation shaft 91a of the motor 91 is connected to a worm shaft 110 of the speed reducer 92. The worm shaft 110 is accommodated in a first accommodation portion 111A formed in a gearbox 111 of the speed reducer 92. The first accommodation portion 111A is formed in a rectangular box shape extending in the longitudinal direction along the thrust direction of the worm shaft 110. The first accommodation portion 111A is formed with accommodation holes 111A1 penetrating in the longitudinal direction to accommodate the worm shaft 110.

Each of both ends of the worm shaft 110 is pivotally supported by bearing 112. The bearing 112 is supported by a lid 113 attached via bolts 114 to each of the both end faces in the longitudinal direction of the first accommodation portion 111A. A recess 111A2 that exposes the worm shaft 110 accommodated in the first accommodation portion 111A is formed on one side wall portion in the lateral direction of the first accommodation portion 111A. The recess 111A2 is formed in an arc shape in plan view shown in FIG. 9.

The gearbox 111 has a second accommodation portion 111B formed in a semi-cylindrical shape on one side in the lateral direction of the first accommodation portion 111A in which the recess 111A2 is formed. As shown in FIG. 10, the second accommodation portion 111B is continuously provided on the lower surface of the first accommodation portion 111A and protrudes to one side in the lateral direction of the first accommodation portion 111A. The screw shaft 94 of the linear motion device 93 is supported by the second accommodation portion 111B via the bearing 117. As shown in FIG. 11, a worm wheel 115 that meshes with the worm shaft 110 is attached to the screw shaft 94.

The second accommodation portion 111B is formed with an accommodation groove 111B1 for accommodating the bearing 117.

The accommodation groove 111B1 is formed in an annular shape and supports the outer ring 119 of the bearing 117. The bearing 117 includes a V-shaped roller rolling portion formed in the outer ring 119, a V-shaped roller rolling portion formed in the inner ring 118, and a plurality of cylindrical rollers (rolling bodies) 120 rolling on the roller rolling portions of the inner ring 118 and the outer 119. The plurality of rollers 120 are arranged so that the rotation axes are alternately orthogonal to each other. The bearing 117 is a so-called cross roller bearing, and one bearing 117 can receive a load in various directions such as a radial load, an axial load, and a moment load.

As shown in FIG. 10, the outer ring 119 supported by the accommodation groove 111B1 is fixed to the second accommodation portion 111B via a pair of bearing covers 121. A plurality of through-holes 111B2 are formed around the accommodation groove 111B1 of the second accommodation portion 111B at intervals in the circumferential direction. A bolt 123 is inserted into the through-hole 111B2 from the lower surface side of the second accommodation portion 111B. A nut 124 is screwed to the tip of the bolt 123. The bearing cover 121 is fastened and fixed to the second accommodation portion 111B by the bolt 123 and the nut 124. Some of the bolts 123 (for example, shown by dotted lines in FIG. 11) are fastened together with the base table 80, whereby the gearbox 111 is fastened and fixed to the base table 80.

As shown in FIG. 11, the inner ring 118 of the bearing 117 is fixed to the lower end portion of the screw shaft 94. An annular flange 94b having an enlarged diameter outward in the radial direction is formed at the lower end portion of the screw shaft 94. The flange 94b is in contact with the inner ring 118 in the thrust direction (axial direction).

The inner ring 118 is in contact with the worm wheel 115 in the thrust direction. A fixation nut 116 that sandwiches with the flange 94b, the inner ring 118 and the worm wheel 115 in the thrust direction is screwed to the screw shaft 94. That is, the inner ring 118 is sandwiched between the flange 94b and the fixing nut 116 in the thrust direction together with the worm wheel 115.

A mounting hole 94c mounting a variable resistor 130 is formed on the lower end surface of the screw shaft 94. The variable resistor 130 detects the rotation angle or the rotation speed of the screw shaft 94. The variable resistor 130 includes a resistor main body 131 and a knob 132 rotatably provided with respect to the resistor main body 131. The knob 132 is formed in a columnar shape and is inserted into the mourning hole 94c of the screw shaft 94. The resistor main body 131 is fixed to the lower surface of the second accommodation portion 111B via a mounting plate 140.

As shown in FIG. 10, the resistor main body 131 includes a cylindrical portion that supports the vicinity of the base of the knob 132. A male thread 131a is formed on the cylindrical portion. The mounting plate 140 is sandwiched and held between the resistor main body 131 and a fixation nut 141 screwed into the male thread 131a.

Both ends of the mounting plate 140 are fixed to the gearbox 111 (lower surface of the accommodation portion 111B) by bolts 142.

As shown in FIG. 11, the worm wheel 115 has an annular groove 115a accommodating the fixation nut 116 on a side of the fixation nut 116. In addition, the worm wheel 115 comprises a cylindrical portion 115b extending toward the inner ring 118. The cylindrical portion 115b is in contact with the inner ring 118. The cylindrical portion 115b is fixed to the screw shaft 94 by a set screw 125. That is, the set screw 125 regulates the relative rotation of the worm wheel 115 with respect to the screw shaft 94.

The knob 132 of the variable resistor 130 is fixed to the screw shaft 94 by a set screw 126. That is, the set screw 126 regulates the relative rotation of the knob 132 with respect to the screw shaft 94. A minus groove slit 94a is formed on the upper end surface of the screw shaft 94. The slit 94a of the screw shaft 94 is in the same phase as a minus groove slit 132a formed on the knob 132. That is, the knob 132 is fixed to the screw shaft 94 in a state where the slits 94a and 132a are in a matched phase with each other. Thereby, the angle of the slit 132a inserted inside the screw shaft 94, that is, the rotation angle of the knob 132 can be recognized from the angle of the slit 94a.

A nut 95 is screwed above the fixation nut 116 of the screw shaft 94. As shown in FIG. 10, the nut 95 comprises a cylindrical portion 95a and a flange portion 95b. As shown in FIG. 11, the cylindrical portion 95a is inserted into the through-hole 101 formed in the alignment table 100. As shown in FIG. 8, a screw shaft 94 is arranged inside the cylindrical portion 95a, and it is possible to confirm the slit 94a and the like.

The flange portion 95b is a portion extended in a semi-circular shape from the cylindrical portion 95a and abuts on the back surface side of the alignment table 100 as shown in FIG. 11. A plurality of positioning holes 95b2 into which positioning pins 96 are inserted are formed in the flange portion 95b (see FIG. 10). As shown in FIG. 11, the positioning pin 96 is fitted in the fitting hole 102 formed in the alignment table 100. The positioning pin 96 positions the alignment table 100 and the nut 95 in a plane direction (specifically, the X-Z plane direction) intersecting the thrust direction of the screw shaft 94. The positioning pin 96 may be attached to the flange portion 95b side.

In addition, a plurality of screw holes 95b1 (see FIG. 10) into which bolts 128 are screwed are formed in the flange portion 95b. The bolt 128 shown in FIG. 11 is screwed into the screw hole 95b1 from the front side of the alignment table 100 to fix the alignment table 100 to the flange portion 95b. As shown in FIG. 9, a notch portion 95c is formed on the side opposite to the flange portion 95b with the cylindrical portion 95a interposed therebetween. The notch portion 95c is formed to avoid interference with the first accommodation portion 111A of the gearbox 111. The notch portion 95c has a similar shape to the side wall and recess 111A2 on one side in the short direction of the first accommodation portion 111A. The notch portion 95c allows the nut 95 to move to a position in the thrust direction that overlaps the first accommodation portion 111A. As a result, the dimension of the electric actuator 90 in the thrust direction can be reduced, and the electric actuator 90 (specifically, the second accommodation portion 111B and the linear motion device 93) can be arranged in the clearance between the base table 80 and the alignment table 100 shown in FIG. 6.

According to the electric actuator 90 having the above-described configuration, when the worm shaft 110 is rotated by the motor 91, the worm wheel 115 that meshes with the worm shaft 110 rotates as shown in FIG. 11. When the worm wheel 115 rotates, the screw shaft 94 fixed to the worm wheel 115 rotates around the axis, and the nut 95 fixed to the alignment table 100 is screwed in the thrust direction. By setting the thrust direction of the screw shaft 94 to the optical axis direction (Y-axis direction) shown in FIG. 5, the alignment table 100 can be moved in a direction (Y-axis direction) approaching or separating from the base table 80.

Figure 12:
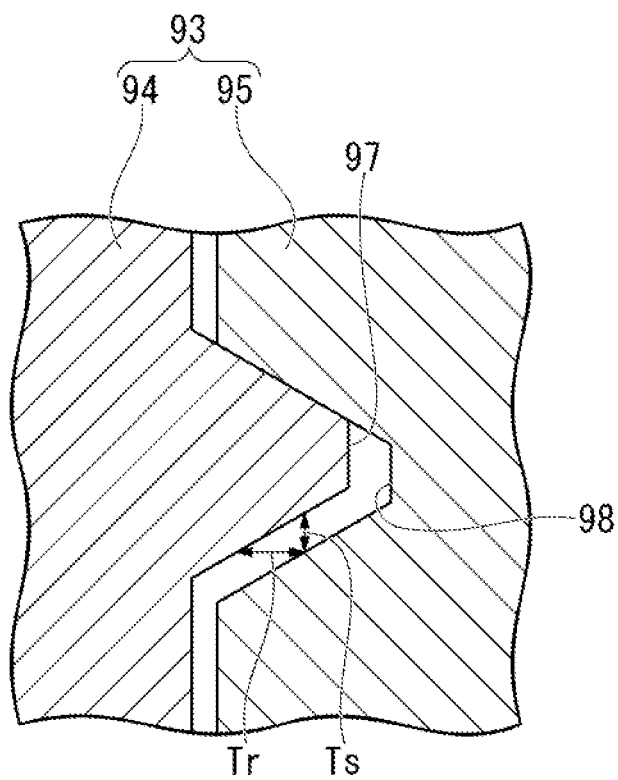
FIG. 12 is an enlarged view of a meshing portion between a nut and a screw shaft according to the second embodiment of the present invention.

FIG. 12 is an enlarged view of the meshing portion between the nut 95 and the screw shaft 94 in the second embodiment of the present invention.

As shown in FIG. 12, between the nut 95 and the screw shaft 94, as a tilt angle-adjustment portion for inclining the alignment table 100 with respect to the base table 80 and the X-Z plane, there are the above-described Tr, which is the clearance in the radial direction, and the above-described Ts, which is the clearance amount in the thrust direction. It is preferable that Tr be larger than Trg obtained by adding Trs obtained by converting Ts into a clearance amount in the radial direction.

Figure 13:
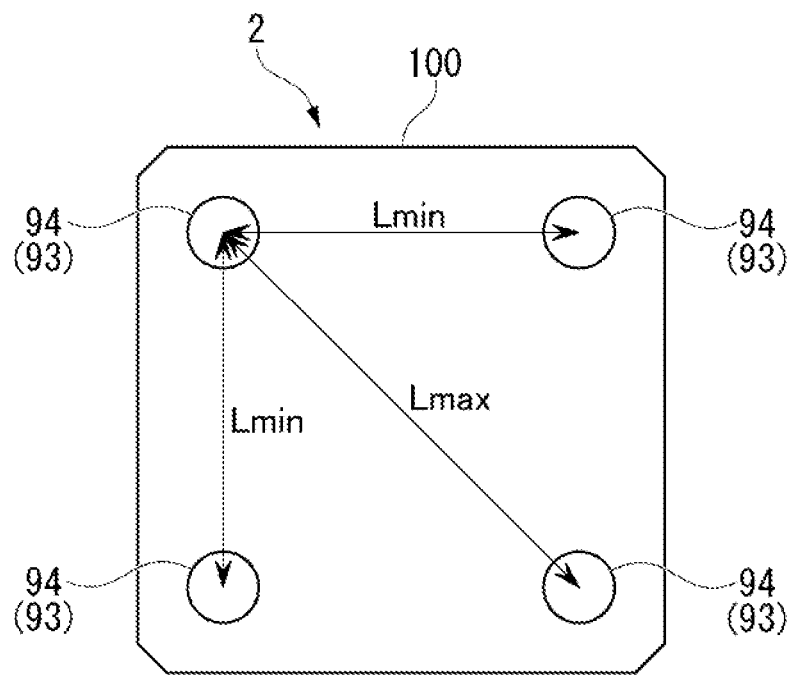
FIG. 13 is an explanatory diagram showing how to set an appropriate clearance amount between the nut and the screw shaft in the second embodiment of the present invention.

FIG. 13 is an explanatory diagram showing how to set an appropriate clearance amount between the nut 95 and the screw shaft 94 in the second embodiment of the present invention.

As shown in FIG. 13, since in the second embodiment, there are four screw shafts 94 (linear motion device 93), the mutual distance L between the screw shafts 94 in Equations (4) to (9) described above is preferably Lmax, which is the longest among the mutual distances. That is, it is preferable that each linear motion device 93 have a clearance amount in the radial direction that satisfies the relationship of the above-described formulas (4) to (9) with L=Lmax. As a result, when the alignment table 100 is inclined, the clearance amount of each linear motion device 93 is set based on the clearance amount between the nut 95 and the screw shaft 94 of the linear motion device 93 where the dimension is the strictest, thereby, alignment can be adjusted on the safeside.

Returning to FIG. 11, on the back side of the alignment table 100, an urging member 151 for urging the alignment table 100 in a direction approaching or separating from the base table 80 is arranged. The urging member 151 is a compressed coil spring. The urging member 151 is arranged around a boll 150. The bolt 150 is inserted into an insertion hole 103 from the front side of the alignment table 100 and screwed into the base table 80. The urging member 151 can suppress rattling of the alignment table 100 due to the looseness of the screw shaft 94 and the nut 95 described above.

A hole 103a and a spot face 103b are formed in the insertion hole 103. A clearance is formed in the radial direction between the hole 103a and the bolt 150 and between the spot face 103b and the bolt 150. The clearance is larger than the clearance between the screw shaft 94 and the nut 95 described above, and allows the alignment table 100 to incline with respect to the base table 80 using the clearance between the screw shaft 94 and the nut 95. That is, the bolt 150 does not fix the alignment table 100, and the bolt 150 functions as a stopper for the alignment table 100 due to the urging of the urging member 151.

Subsequently, the alignment operation (alignment work) of the electric alignment device 2 using the electric actuator 90 having the above-described configuration will be described.

As shown in FIG. 5, the electric alignment device 2 includes a plurality of electric actuators 90 that support the alignment table 100. According to the electric alignment device 2, for example, the tilt angle around the X axis of the lens 200 can be adjusted by driving the electric actuators 90 arranged vertically with the mounting hole 100a of the alignment table 100 interposed therebetween. In addition, the electric alignment device 2 can adjust the tilt angle around the Z axis of the lens 200 by driving the electric actuators 90 arranged on the left and right sides of the mounting hole 100a of the alignment table 100.

The electric alignment device 2 can also adjust the tilt angle around the diagonal line 203 of the lens 200, which is orthogonal to the diagonal line 202, by driving the electric actuator 90 arranged on the diagonal line 202 of the mounting hole 100a. The electric alignment device 2 can also adjust the tilt angle around the diagonal line 202 of the lens 200, which is orthogonal to the diagonal line 203, by driving the electric actuator 90 arranged on the diagonal line 203 of the mounting hole 100a.

In addition, the electric alignment device 2 can adjust the focus of the lens 200 by synchronously driving all the electric actuators 90 arranged at four positions around the mounting holes 100a of the alignment table 100 to move the alignment table 100 so as to approach or separate from the base table 80.

As described above, according to the above-described embodiment, the electric alignment device 2 includes a base table 80, a plurality of electric actuators 90 attached to the base table 80, and an alignment table 100 supported by the plurality of electric actuators 90. Each of the plurality of electric actuators 90 has a linear motion device 93 driving the alignment table 100 in a direction approaching or separating from the base table 80. With the above-described configuration, the alignment operation of the lens 200, which has been performed manually in the past, can be electrified by the electric actuator 90, and a highly precise alignment operation can be easily performed by feeding the high-precision linear motion device 93. For example, the operator can easily perform the alignment operation by operating the remote controller while viewing the image projected on the screen. As a result, the alignment operation docs not require skill such as screw-driving, and the alignment operation can be performed even after being incorporated in a projector or the like.

In the present embodiment, as shown in FIG. 11, the linear motion device 93 includes the nut 93 fixed to the alignment table 100 and the screw shaft 94 that drives the nut 95 in the thrust direction approaching or separating from the base table 80. According to such a configuration, the alignment table 100 can be moved with high accuracy with respect to the base table 80 by screw-feeding of the nut 95 by the screw shaft 94.

In the present embodiment, as shown in FIG. 12, the clearance amount Tr in the radial direction is set as a tilt angle-adjustment portion for inclining the alignment table 100 with respect to the base table 80 between the screw shaft 94 and the nut 95. When there are four screw shafts 94 as in the present embodiment, the mutual distance L of the screw shafts 94, which is one of the variables for calculating Tr, may be the longest distance Lmax among the mutual distances of the screw shafts 94. According to such a configuration, the clearance amount between the nut 95 and the screw shaft 94 in the radial direction can be set on the safety side, so that adjustment suitable for any tilt angle of the lens 200 is possible. Similarly, even when there are three, five or more screw shafts 94, L may be the longest distance Lmax among the mutual distances therebetween.

In the present embodiment, as shown in FIG. 11, the urging member 151 urges the alignment table 100 in a direction approaching or separating from the base table 80. According to such a configuration, it is possible to prevent the alignment table 100 from rattling due to the clearance set between the screw shaft 94 and the nut 95.

In the present embodiment, the present embodiment includes a positioning pin 96 that positions the alignment table 100 and the nut 95 in the plane direction (radial direction) that intersects the thrust direction. According to such a configuration, when the nut 95 is fixed to the alignment table 100, it is possible to prevent a position shift in the plane direction. Therefore, it is possible to prevent the consumption of Tr, which is the clearance amount in the radial direction set between the screw shaft 94 and the nut 95, due to the displacement of the nut 95 in the plane direction. That is, since it is not necessary to absorb the shift of the nut 95 with the Tr of the clearance amount, the alignment table 100 can be appropriately inclined.

The lens alignment system 1 of the present embodiment includes an electric alignment device 2 that adjusts at least one of the tilt angle of the lens 200 that projects light and the focus of the lens 200, and an electric lens shift device 3 that supports the electric alignment device 2 and moves the electric alignment device 2 at least in the two-axis orthogonal direction orthogonal to the optical axis direction of light. According to such a configuration, lens alignment can be automated. For example, by capturing a projection image projected on the screen with a camera built into a projector and automating tilt adjustment of the electric alignment device 2, and by combining with the lens shift of the electric lens shift device 3, the installation operation of the projector is automated.

Although the preferred embodiments of the present invention have been described above with reference to the drawings, the present invention is not limited to the above-described embodiments. The various designs, combinations, and the like of the constituent members shown in the above-described embodiments are merely examples, and can be variously modified based on design requirements and the like within a range that does not deviate from the gist of the present invention.

For example, in the embodiment described above, the configuration in which four electric actuators 90 are provided has been described; however, the number of electric actuators 90 may be three or more (that is, three or more screw shafts 94). Even if there are two electric actuators 90, it is possible to adjust the tilt angle in one direction (for example, only the adjustment of the tilt angle in the horizontal direction).

In addition, for example, in the embodiment described above, as the linear motion device 93, the configuration in which the nut 95 is screw-fed by the screw shaft 94 has been described; however, the linear motion device 93 is not limited to such a configuration. For example, the linear motion device 93 may be a ball screw or the like in which a rolling body is interposed. Furthermore, the electric actuator 90 may have a configuration in which a linear motor is used as a drive source as well as a configuration in which a rotary motor is used as a drive source, or an element such as a piezoelectric element (piezo element) converting other electric power into force is used as a drive source.

Furthermore, for example, in the embodiment described above, the configuration in which the electric lens shift device 3 moves the electric alignment device 2 in the two-axis orthogonal direction orthogonal to the optical axis direction has been described; however, a configuration may be used such that a linear guide 60 in the Y-axis direction is added and the electric lens shift device 3 moves the electric alignment device 2 in a three-axis orthogonal direction including the optical axis direction. The drive portion may be removed from the electric lens shift device 3 and used as a manual leas shift device.

For example, in the embodiment described above, the configuration in which the linear motion device 93 moves the nut 95 fixed to the alignment table 100 (one side) so as to approach or separate from the base table 80 (the other side) has been described; however, the nut 95 may be fixed to the table 80 and the nut 95 may approach or separate from the alignment table 100. In this case, the positioning pin 96 positioning the nut 95 may be attached to the base table 80 side.

INDUSTRIAL APPLICABILITY

According to the above-described aspects of the present invention, an alignment device and a lens alignment system having an appropriate clearance amount between the nut and the screw shaft with respect to the target inclination of the alignment table can be obtained.

DESCRIPTION OF THE REFERENCE SYMBOLS

1: Lens alignment system
2: Electric alignment device (alignment device)
3: Electric lens shift device (lens shift device)
80: Base table
90: Electric actuator
91: Motor
93: Linear motion device
94: Screw shaft
95: Nut
100: Alignment table

The invention claimed is:

1. An electric alignment device comprising:
a base table;
a plurality of electric actuators attached to the base table; and
an alignment table supported by the plurality of electric actuators,
wherein each of the plurality of electric actuators comprises a linear motion device that drives the alignment table in a direction approaching or separating vertically from the base table, and
wherein the linear motion device comprises:
a nut fixed to one of the base table and the alignment table; and
a screw shaft that drives the nut in an axial direction approaching or separating from the other of the base table and the alignment table.

2. The electric alignment device according to claim 1, wherein a tilt angle-adjustment portion tilting the alignment table with respect to the base table is formed between the screw shaft and the nut.

3. The electric alignment device according to claim 1, comprising an urging member urging the alignment table in a direction separated with respect to the base table.

4. The electric alignment device according to claim 1, comprising a positioning pin positioning the nut and one of the base table and the alignment table in a plane direction intersecting an axial direction.

5. A lens alignment system comprising:
the electric alignment device according to claim 1 that adjusts the tilt angle of a lens that projects light and at least one of the focus of the lens; and
an electric lens shift device that supports the electric alignment device and moves the electric alignment device at least in a two-axis orthogonal direction orthogonal to the optical axis direction of the light.

6. An alignment device comprising:
a base table;
a plurality of linear motion devices attached to the base table; and
an alignment table supported by the plurality of linear motion devices,
wherein each of the plurality of linear motion devices comprises
a nut fixed to one of the base table or the alignment table, and
a screw shaft that moves the nut in a direction approaching or separating from the other of the base table or the alignment table, and
when an outer diameter of the screw shaft is M, a distance between the screw shafts is L, an inclination of the alignment table with respect to the base table is θ, a length of the nut with respect to the screw shaft in the thrust direction is N, and a clearance amount in a radial direction between the nut and the screw shaft is Tr, the relationship Tr>(M+L)(1−cos θ)+N sin θ is satisfied.

7. The alignment device according to claim 6, wherein when a hooking height in the radial direction of the nut with respect to the screw axis is H1 and a thread angle is Φ, the relationship Trg=(M+L)(1−cos θ)+N sin θ+H1sin θ/tan Φ is satisfied.

8. The alignment device according to claim 6, wherein L is the longest distance among the mutual distances when the number of screw shafts is three or more.

9. The alignment device according to claim 6, wherein the linear motion device is an electric actuator comprising a motor rotating the screw shaft.

10. The alignment device according to claim 6, comprising an urging member urging the alignment table in a direction approaching or separating from the base table.

11. A lens alignment system, comprising:
the alignment device described in claim 6 that adjusts at least one of the tilt angle of the lens that projects the light and the focus of the lens, and
a lens shift device that supports the alignment device and moves the alignment device at least in a two-axis orthogonal direction orthogonal to the optical axis direction of the light.

* * * * *